(12) United States Patent
Manna et al.

(10) Patent No.: US 11,378,963 B2
(45) Date of Patent: Jul. 5, 2022

(54) METHOD AND CONTROL UNIT FOR A SYSTEM FOR CONTROLLING A MOTOR VEHICLE

(71) Applicant: ZF Automotive Germany GmbH, Alfdorf (DE)

(72) Inventors: Carlo Manna, Genk (BE); Manuel Schmidt, Dortmund (DE); Christian Wissing, Wesel (DE); Andreas Homann, Dortmund (DE); Christian Lienke, Dortmund (DE); Niklas Stannartz, Dortmund (DE); Torsten Bertram, Düsseldorf (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 60 days.

(21) Appl. No.: 16/822,056

(22) Filed: Mar. 18, 2020

(65) Prior Publication Data
US 2020/0301434 A1    Sep. 24, 2020

(30) Foreign Application Priority Data

Mar. 22, 2019    (DE) ...................... 10 2019 107 414.2

(51) Int. Cl.
*G05D 1/02*    (2020.01)

(52) U.S. Cl.
CPC ......... *G05D 1/0214* (2013.01); *G05D 1/0217* (2013.01); *G05D 2201/0212* (2013.01); *G05D 2201/0213* (2013.01)

(58) Field of Classification Search
CPC ............... G05D 1/0214; G05D 1/0217; G05D 2201/0213; G05D 2201/0212; B60W 2520/10; B60W 2554/4042; B60W 2554/802; B60W 30/12; B60W 30/18163; B60W 40/04; B60W 40/06; B60W 50/00; B60W 2050/0019
See application file for complete search history.

(56) References Cited

U.S. PATENT DOCUMENTS

| 2015/0142207 | A1 | 5/2015 | Flehmig et al. | |
| 2017/0015312 | A1* | 1/2017 | Latotzki | ............... B62D 15/027 |

FOREIGN PATENT DOCUMENTS

| DE | 102013219414 | 3/2015 |
| DE | 102015221626 | 5/2017 |

(Continued)

*Primary Examiner* — Rodney A Butler
(74) *Attorney, Agent, or Firm* — Tarolli, Sundheim, Covell & Tummino LLP

(57) ABSTRACT

A method is proposed for controlling a motor vehicle (10) traveling on a roadway (12) in a current lane (14), wherein the roadway (12) has at least one additional lane (16) that is adjacent to the current lane (14) of the motor vehicle (10). The method has the following steps: At least one possible driving maneuver for the motor vehicle (10) is generated and/or received. A cost functional is determined, wherein the cost functional associates a cost factor with the at least one possible driving maneuver. At least one time-variant constraint is determined and/or received. The cost functional is extremized under the at least one time-variant constraint, and the possible driving maneuver is adapted based on the extremized cost functional, so that a target driving maneuver is obtained. In addition, a control unit (30) for a system (26) for controlling a motor vehicle (10) is proposed.

10 Claims, 6 Drawing Sheets

(56) References Cited

FOREIGN PATENT DOCUMENTS

| | | |
|---|---|---|
| DE | 102017205245 | 4/2018 |
| DE | 102017213029 | 1/2019 |
| DE | 102018204101 | 9/2019 |
| JP | 2015230547 A * | 12/2015 |

* cited by examiner

METHOD AND CONTROL UNIT FOR A SYSTEM FOR CONTROLLING A MOTOR VEHICLE

RELATED APPLICATION

This application claims priority from German Application No. 10 2019 107 414.2 filed Mar. 22, 2019, the subject matter of which is incorporated herein by reference in its entirety.

BACKGROUND OF THE INVENTION

The invention relates to a method for controlling a motor vehicle, a control unit for a system for controlling a motor vehicle, a motor vehicle, and a computer program for carrying out the method.

One of the main challenges for driving assistance systems that control a longitudinal motion and a transverse motion of a motor vehicle in a partially automated manner, and in particular for motor vehicles that travel in a completely automated manner, is to analyze a specific situation that the motor vehicle is in, and based on this analysis to derive appropriate, meaningful driving maneuvers for the motor vehicle.

The complexity in computing the driving maneuvers generally increases with the duration of the individual driving maneuvers. If various possible driving maneuvers are to be determined for a fairly long time period, for example longer than three seconds, or if complex driving maneuvers with multiple lane changes are involved, previously known methods are often not able to determine these in real time.

One particular challenge is that in practically every traffic situation there is a very large number of options for how the motor vehicle can be controlled. The various options may be very different from one another, for example with regard to the required travel time. In particular in heavy traffic, the previously known methods are often not able to select the appropriate option from the various possibilities for controlling the motor vehicle.

SUMMARY OF THE INVENTION

The object of the invention, therefore, is to provide a method and a control unit for a system for controlling a motor vehicle which represent an improvement over the disadvantages of the prior art.

The object is achieved according to the invention by a method for controlling a motor vehicle traveling on a roadway in a current lane, the roadway having at least one additional lane that is adjacent to the current lane in which the motor vehicle is traveling. The method has the following steps: at least one possible driving maneuver for the motor vehicle is generated and/or received. A cost functional is determined, wherein the cost functional associates a cost factor with the at least one possible driving maneuver. At least one time-variant constraint is determined and/or received. The cost functional is extremized under the at least one time-variant constraint, and the possible driving maneuver is adapted based on the extremized cost functional, so that a target driving maneuver is obtained.

Here and in the following discussion, "driving maneuver" is always understood to mean a corresponding space-time trajectory that describes the driving maneuver in a coordinate system generally having two spatial dimensions and one time dimension. Accordingly, the cost functional associates an appropriate cost factor with each of these space-time trajectories.

The target driving maneuver is the driving maneuver that is extremized by the cost functional. In other words, the cost functional for the target driving maneuver has at least one local extreme, in particular a global extreme. Accordingly, the target driving maneuver is a driving maneuver that is optimized with respect to similar possible driving maneuvers, and in particular is an optimal driving maneuver that is optimized with respect to all other possible driving maneuvers.

In the following discussion, an "optimized driving maneuver" is always understood to mean a driving maneuver whose associated space-time trajectory is at least locally extremized, in particular globally extremized, by the cost functional.

According to the invention, time-variant constraints are taken into account during the extremization of the cost functional, i.e., during the optimization of the driving maneuver. The current traffic situation in which the motor vehicle is in is thus taken into account in optimizing the driving maneuver. Accordingly, an appropriate driving maneuver for the motor vehicle may be generated in any traffic situation in real time by use of the method according to the invention.

In other words, the constraints are not temporally static constraints, but, rather, constraints that change over time and describe the current and/or future traffic situation in which the motor vehicle is in.

For example, at least one traffic parameter that describes the current traffic situation is incorporated into the time-variant constraint. The at least one traffic parameter may be one or more of the following variables: a current or future position of the motor vehicle, a current or future position of at least one further road user, a current or future speed of the motor vehicle, a current or future speed of the at least one further road user, a predicted space-time trajectory of at least one further road user, a current speed limit, and/or a change in the number of lanes that can be traveled in.

In one embodiment, the cost functional is minimized to obtain the target driving maneuver. Since the cost factor is smaller the more favorable the driving maneuver in question, the optimal driving maneuver, i.e., the target driving maneuver, may thus be easily determined.

It is pointed out that in another possible definition of the cost functional, for example for a cost functional that is multiplied by −1, the cost functional must be maximized in order to obtain the target driving maneuver. However, the definition of the cost function selected above corresponds to the intuitive understanding of a cost factor, namely, the more favorable the driving maneuver in question, the smaller the corresponding cost factor.

The cost functional preferably includes terms that characterize one or more aspects of the particular driving maneuver. For example, the cost functional includes terms that take into account driving comfort during travel and/or a desired speed to be attained. Alternatively or additionally, the cost functional may include penalty terms that increase the cost factor for predefined driving maneuver components. For example, a penalty term for a lane change may be provided, so that driving maneuvers that require a large number of such lane changes are suppressed.

In addition, the cost functional is preferably quadratic in the possible driving maneuver in question. More precisely, the cost functional is quadratic in the space-time trajectory of the possible driving maneuver in question. In particular, the cost functional includes a quadratic term and a linear term.

One aspect of the invention provides that in each case at least one, in particular in each case exactly one, possible driving maneuver is generated and/or obtained from multiple different driving maneuver classes, wherein a target driving maneuver is determined for each possible driving maneuver. Accordingly, for each of the driving maneuver classes from which a driving maneuver is obtained or generated, in each case at least one target driving maneuver, in particular exactly one target driving maneuver, is determined. An associated optimized driving maneuver is thus obtained for each of the various driving maneuver classes.

In other words, driving maneuvers that are conceptually different from one another, i.e., the driving maneuvers from different driving maneuver classes, are optimized in each case. Multiple target driving maneuvers that are conceptually different from one another are thus obtained. "Conceptually different" means, for example, that the particular space-time trajectories of the driving maneuvers are not homotopic relative to one another, i.e., cannot be continuously converted from one into another without crossing a barrier.

For example, the individual driving maneuver classes differ with respect to the time sequence in which individual further road users are passed, and/or with respect to the time sequence in which individual further road users travel past the motor vehicle in the travel direction of the motor vehicle or in the opposite direction.

The driving maneuver classes are preferably disjunct; i.e., each driving maneuver can be associated with only one driving maneuver class. Accordingly, driving maneuvers from two different driving maneuver classes differ by one or more characteristic variables which describe the essential features of the particular driving maneuver.

According to another aspect of the invention, one of the target driving maneuvers is selected and the motor vehicle is controlled according to the selected target driving maneuver, in particular wherein one of the target maneuvers is selected based on predefined criteria. The motor vehicle is controlled at least partially automatically, in particular completely automatically, based on the selected target driving maneuver.

The predefined criteria may be stored in the motor vehicle by the manufacturer and/or may be adapted by the driver of the motor vehicle. For example, the predefined criteria include one or more of the following variables: a maximum duration of the driving maneuver, a maximum speed and/or minimum speed of the motor vehicle, a maximum occurring longitudinal acceleration of the motor vehicle, and/or a maximum occurring transverse acceleration of the motor vehicle.

Alternatively or additionally, it may be provided that an appropriately trained machine learning module of one of the target driving maneuvers is selected, the motor vehicle being controlled according to the selected target driving maneuver.

In addition, the predefined criteria may be a function of a selected driving mode of the motor vehicle. Thus, in a sport mode, for example, more importance could be attached to a short duration of the driving maneuver, while intense accelerations that occur are assessed less negatively.

The multiple different target driving maneuvers are preferably transmitted to a decision and control module of the motor vehicle, which automatically selects one of the target driving maneuvers and controls the motor vehicle at least partially automatically, in particular completely automatically, based on the selected target driving maneuver.

In another embodiment of the invention, the at least one time-variant constraint is determined based on the driving maneuver class. The time-variant constraints are accordingly individually adapted to the particular driving maneuver class, so that the special features of the driving maneuvers from the particular driving maneuver classes are taken into account.

The at least one time-variant constraint may include a safety condition, a comfort condition, and/or a feasibility condition. One example of a feasibility condition is whether the motor vehicle can even reach a certain space-time region based on a maximum acceleration or a maximum deceleration of the motor vehicle. One example of a comfort condition is whether the acceleration in the longitudinal and/or transverse direction exceeds a predefined limit value which, based on experience, is perceived as uncomfortable by the vehicle occupants. One example of a safety condition is a minimum distance to be maintained from other road users, or a speed limit.

In particular, the at least one safety condition includes a predetermined spatial safety distance and/or a predetermined temporal safety distance. A "temporal safety distance" is understood to mean a time period in which the vehicle, starting from the current point in time, can definitively move in a collision-free manner, even if the motor vehicle does not change its motion state, for example does not brake. This time period may also be referred to as "time to collision."

A spatial safety distance always corresponds to a temporal safety distance; however, the temporal safety distance is a function of the current speed of the motor vehicle. More precisely, the temporal safety distance results from the quotient of the spatial safety distance and the current speed of the motor vehicle.

The following steps are preferably carried out for determining the at least one time-variant constraint:
  ascertaining free areas and/or occupied areas that are occupied by other road users, at least in the current lane of the motor vehicle and in the at least one additional lane, wherein the free areas and the occupied areas are space-time regions; and
  determining the at least one time-variant constraint, based on the determined free areas and/or the determined occupied areas.

One or more constraints automatically result from the method steps mentioned above. For example, it is clear that the motor vehicle should not be situated in an occupied space-time region, since this corresponds to a collision. However, even further time-variant constraints may be determined, based on the determined occupied areas and/or the determined free areas.

A further aspect of the invention provides that the time-variant constraint includes a minimum distance from an edge of a free area and/or a minimum distance from an occupied area at a predefined point in time, in particular taking into account the minimum distance for the at least one possible driving maneuver at multiple predefined points in time. The minimum distance may be a spatial distance and/or a temporal distance. In other words, the time-variant constraint thus includes a spatial safety distance and/or a temporal safety distance from occupied areas.

In another embodiment of the method according to the invention, the minimum distance is determined based on a speed of the motor vehicle at the predefined point in time, in particular taking into account a predetermined spatial safety distance and/or based on a predetermined temporal safety distance. In particular, the minimum distance is increased with increasing speed of the motor vehicle. The longer braking distance at higher speeds, among other factors, is thus taken into account.

In particular, in each case at least one space-time polygon corresponding to the current lane, at least one space-time polygon corresponding to the at least one additional lane, and at least one space-time polygon corresponding to the occupied areas are determined, wherein based on the determined space-time polygons, space-time polygons corresponding to the free areas of the two lanes are determined by polygon clipping, wherein in particular those polygons corresponding to the occupied areas are removed in each case from the polygons that correspond to one of the two lanes in order to determine the free areas. The determination of the free areas and the occupied areas is thus reduced to a geometric operation that can be carried out very quickly with conservation of resources. Computing time for determining the time-variant constraints is thus saved.

One embodiment of the invention provides that at least the current lane and/or the at least one additional lane are/is transformed into a Frenet-Serret coordinate system. In this coordinate system each roadway is free of curves, so that each traffic situation may be handled in the same way, regardless of the actual course of the roadway.

The object is further achieved according to the invention by a control unit for a system for controlling a motor vehicle or for a motor vehicle, the control unit being designed to carry out a method described above. With regard to the advantages and features, reference is made to the above discussion concerning the method, which correspondingly also applies to the control unit.

The object is further achieved according to the invention by a motor vehicle having an above-described control unit. With regard to the advantages and features, reference is made to the above discussion concerning the method, which correspondingly also applies to the motor vehicle.

The object is further achieved according to the invention by a computer program having program code means for carrying out the steps of a method described above when the computer program is executed on a computer or a corresponding processing unit, in particular a processing unit of a control unit described above. With regard to the advantages and features, reference is made to the above discussion concerning the method, which correspondingly also applies to the computer program.

Here and in the following discussion, "program code means" are computer-executable instructions in the form of program code and/or program code modules in compiled and/or uncompiled form, which may be present in any given programming language and/or machine language.

BRIEF DESCRIPTION OF THE DRAWINGS

Further advantages and characteristics of the invention result from the following description and the appended drawings, to which reference is made. In the drawings.

DESCRIPTION

Figure 1:
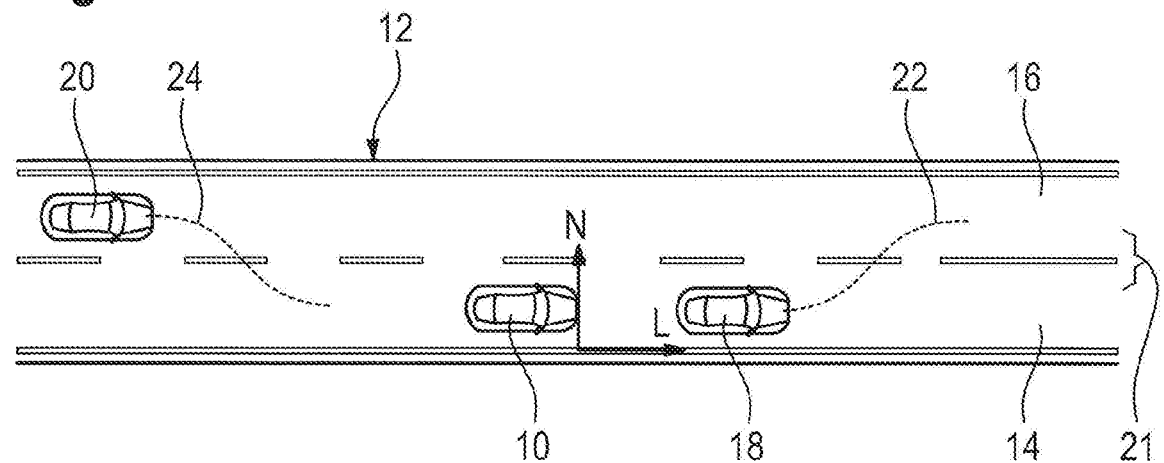
FIG. 1 schematically shows a traffic situation.

FIG. 1 schematically shows a traffic situation in which a motor vehicle 10 is traveling on a roadway 12 in a current lane 14. Next to the current lane 14 is an additional lane 16.

Also traveling on the roadway 12 are a first further road user 18 in the current lane 14, and a second further road user 20 in the additional lane 16. In the example shown, the further road users 18, 20 are passenger vehicles, although they could also be trucks, motorcycles, or any other given road users.

Situated between the current lane 14 and the additional lane 16 is a lane change zone 21 which partially overlaps with the current lane 14 and the additional lane 16.

The dashed lines 22 and 24 respectively indicate that the first further road user 18 in the near future is planning to change from the current lane 14, via the lane change zone 21, into the additional lane 16, and that the second further road user 20 in the near future is planning to change from the further lane 16, via the lane change zone, into the current lane 14 of the motor vehicle 10. The further road users 18, 20 indicate this, for example, by using the appropriate turn signal.

FIG. 1 also shows a coordinate system having a longitudinal axis and a perpendicular axis, the longitudinal axis defining a longitudinal direction L and the perpendicular axis defining a transverse direction N. The origin of the coordinate system lies in the longitudinal direction L at the current position of the very front of the motor vehicle 10, and on the right edge of the road, viewed in the longitudinal direction L.

This particular coordinate system, which is also used for the following discussion, is a coordinate system which is fixed to the roadway, and which therefore does not move with the motor vehicle 10. Of course, any other given coordinate system may also be used.

Figure 2:
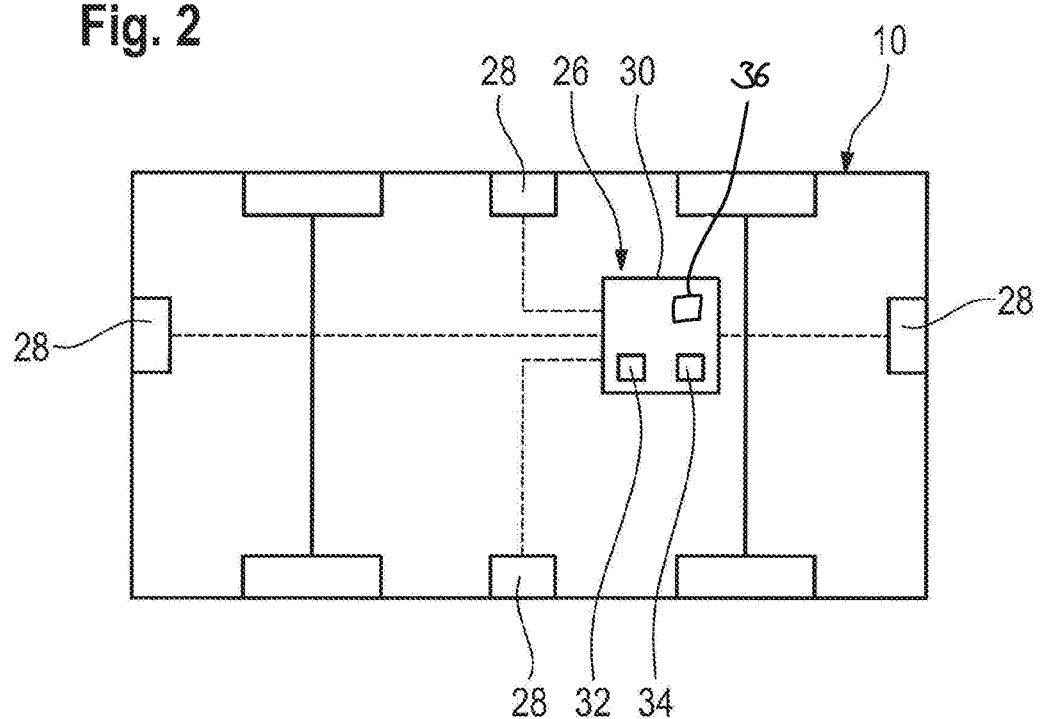
FIG. 2 shows a schematic block diagram of a system according to the invention for controlling a motor vehicle.
Figure 3:
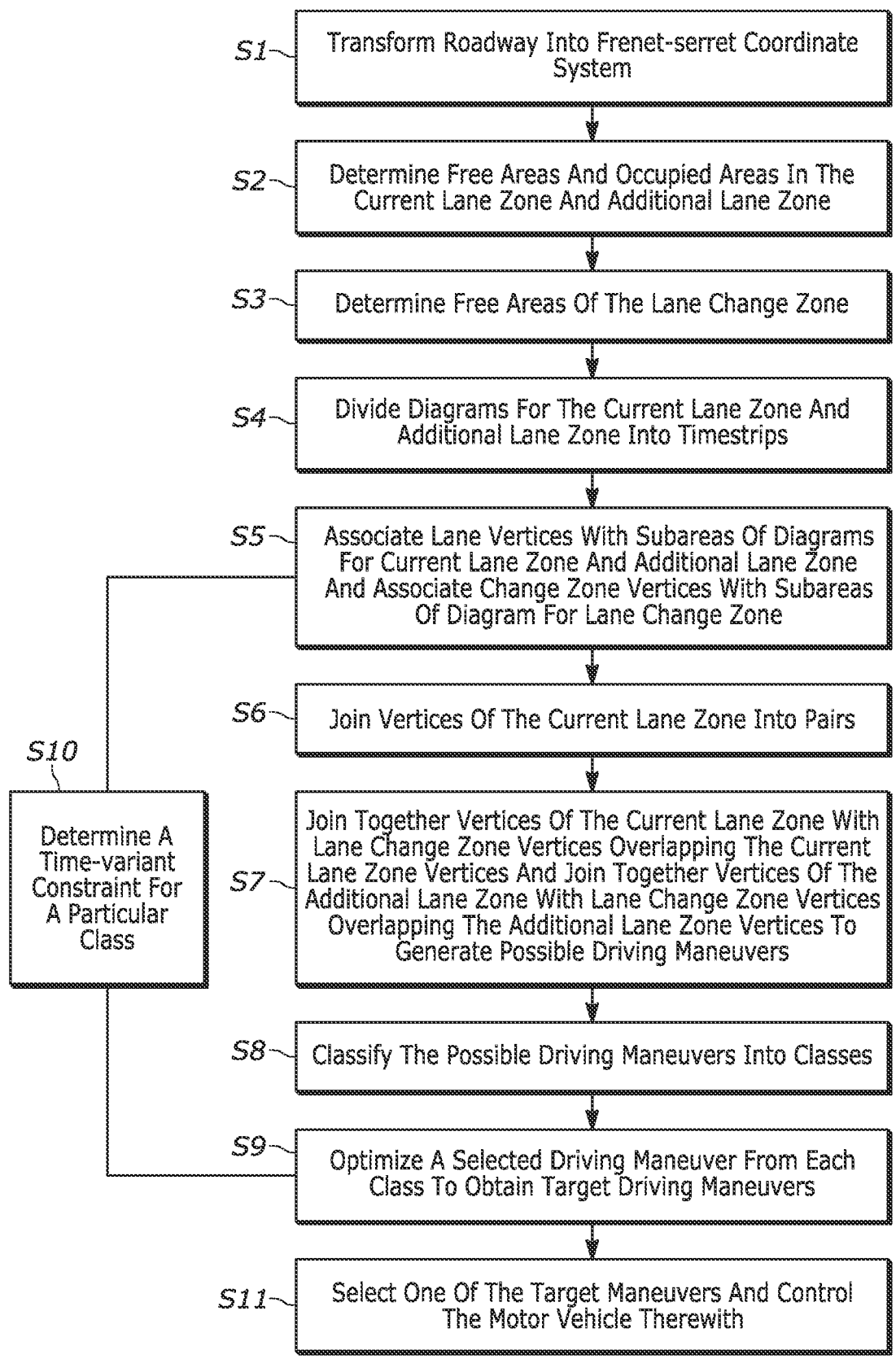
FIG. 3 shows a flow chart of the steps of a method according to the invention.

As shown in FIG. 2, the motor vehicle 10 has a system 26 for controlling the motor vehicle 10. The system 26 includes multiple sensors 28 and at least one control unit 30.

The sensors 28 are situated at the front, rear and/or sides of the motor vehicle 10, and are designed to detect the surroundings of the motor vehicle 10, generate corresponding surroundings data, and relay the data to the control unit 30. More precisely, the sensors 28 detect information at least concerning the current lane 14, the additional lane 16, and the further road users 18, 20.

The sensors 28 are in each case a camera, a radar sensor, a distance sensor, a lidar sensor, and/or another type of sensor that is suitable for detecting the surroundings of the motor vehicle 10.

Alternatively or additionally, at least one of the sensors 28 may be designed as an interface with a guidance system that is associated at least with the section of the roadway 12 that is shown, and that is designed to transmit surroundings data to the motor vehicle 10 and/or to the further road users 18, 20 via the roadway 12 and/or via the further road users. The one sensor 28 in this case may be designed as a mobile radio communication module, for example for communication according to the 5G standard.

In general, the control unit 30 processes the surroundings data received from the sensors 28 and controls the motor vehicle 10 based on the processed surroundings data, in an at least partially automatic manner, in particular completely automatically. Thus, a driving assistance system is implemented on the control unit 30 which is able to control a transverse motion and/or a longitudinal motion of the motor vehicle 10 in an at least partially automatic manner, in particular completely automatically.

For this purpose, the control unit 30 is designed to carry out the method steps explained below with reference to FIGS. 3 through 10. More precisely, the control unit 30 includes a data medium 32 and a processing unit 34, a computer program being stored on the data medium 32 and being executed on the processing unit 34, and the program code including means for carrying out the steps of the method explained below.

The roadway 12, more precisely, a representation of the current lane 14 and of the additional lane 16, based on the surroundings data received from the sensors 28, is initially transformed into a Frenet-Serret coordinate system (step S1).

Figure 4:
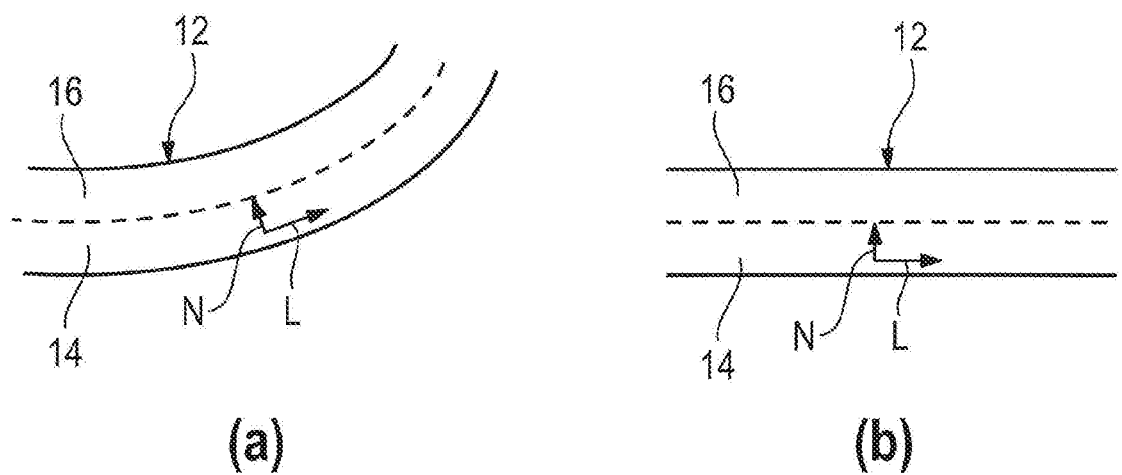
FIGS. 4(a) and 4(b) schematically show a roadway prior to a transformation into a Frenet-Serret coordinate system, and the roadway after a transformation into a Frenet-Serret coordinate system, respectively.

Step S1 is illustrated in FIG. 4. FIG. 4(a) shows the roadway 12 as it actually runs. In the example shown, the roadway, viewed in the longitudinal direction L, curves to the left. As the result of a local coordinate transformation the roadway 12 is transformed into the Frenet-Serret coordinate system, in which the roadway 12 is no longer curved, the result of this transformation being shown in FIG. 4(b). As is clearly apparent, in this coordinate system the roadway 12 runs straight, without a curve, along the longitudinal direction L.

Next, free areas $B_f$ and occupied areas $B_b$ in the current lane 14 and in the additional lane 16 are determined (step S2); the free areas $B_f$ and the occupied areas $B_b$ are each space-time regions.

The free areas $B_f$ are those space-time regions that are free of the other road users 18, 20 and other obstacles that prevent traveling in the particular lane 14, 16.

In contrast, the occupied areas $B_b$ are those space-time regions that are occupied by the other road users 18, 20 and/or by other obstacles, so that the occupied areas $B_b$ cannot be traveled on by the motor vehicle 10.

The control unit 30 requires predicted trajectories 22, 24 of the further road users 18, 20 in order to determine the occupied areas. The control unit 30 may determine the trajectories 22, 24 itself, for example based on the surroundings data obtained from the sensors 28, such as the information that a turn signal of a further road user 18, 20 is activated, or based on data that are exchanged via inter-vehicle communication. Alternatively, the control unit 30 may obtain the trajectories 22, 24 directly from the further road users 18, 20 or from the guidance system.

Figure 5:
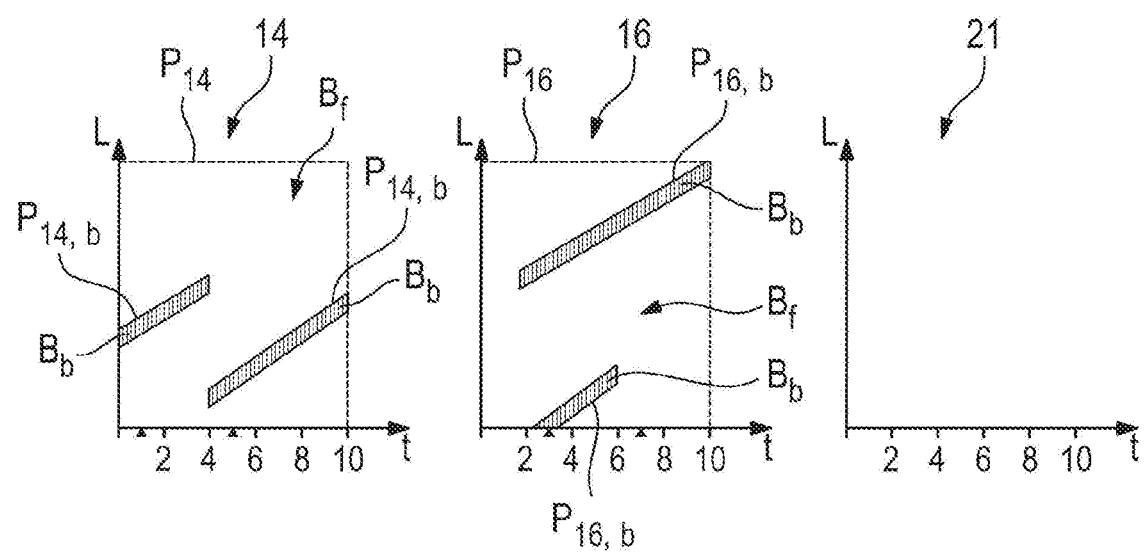
FIGS. 5 through 10 each show an illustration of individual steps of the method according to the invention from FIG. 3.

As shown in FIG. 5 with reference to the specific example in FIG. 1, the free areas $B_f$ and the occupied areas $B_b$ are each initially determined for the current lane 14 and for the additional lane 16, in particular in each case in a t-L diagram, where t is time.

In this example, at time t=1 s the first further road user 18 starts a lane change maneuver from the current lane 14 toward the additional lane 16, which is completed at time t=5 s. In the diagrams shown in FIG. 5, the first further road user 18 in each case occupies the upper of the two occupied areas $B_b$. During the lane change operation, the first further road user 18 at least temporarily occupies both lanes 14, 16.

At time t=3 s the second further road user 20 starts a lane change maneuver from the additional lane 16 toward the current lane 14, which is completed at time t=7 s. In the diagrams shown in FIG. 5, the second further road user 20 in each case occupies the lower of the two occupied areas $B_b$.

The slope of the occupied areas $B_b$ corresponds to the speed of the further road user 18 or 20 in question. In the example shown in FIGS. 5 through 10, the speed of the further road users 18, 20 is therefore constant.

For simplification, the coordinate in the transverse direction N is discretized; i.e., it can assume only the three different values that correspond to the current lane 14, the additional lane 16, and the lane change zone 21. The three diagrams shown in FIG. 5 are thus a t-L diagram for the current lane 14, the additional lane 16, and the lane change zone 21, respectively.

The crosshatched sections in the diagrams in each case correspond to the occupied areas $B_b$ of the particular lane 14, 16. In contrast, the noncrosshatched sections in the diagrams correspond to the free areas $B_f$ of the particular lane 14, 16.

To determine the free areas $B_f$ for each lane 14, 16 a space-time polygon $P_{14}$ or $P_{16}$ is initially determined which corresponds to the entire lane 14 or 16, respectively, in front of the motor vehicle 10, in particular the portion of the lanes 14, 16 situated in the range of the sensors 28. In FIG. 5, the polygons $P_{14}$ and $P_{16}$ are the quadrilaterals indicated by the dashed lines.

In addition, for the two lanes 14, 16, space-time polygons $P_{14,b}$ or $P_{16,b}$ are determined in each case which encompass the occupied areas $B_b$ of the particular lane 14, 16.

The free areas $B_f$ in the current lane 14, or more precisely, a polygon $P_{14,f}$ that corresponds to the free areas $B_f$, is then determined by polygon clipping by removing the polygons $P_{14,b}$ from the polygon $P_{14}$. In other words, this involves the operation $$P_{14,f} = P_{14} \backslash P_{14,b}.$$

The free areas $B_f$ in the additional lane 16 are analogously determined by polygon clipping by removing the polygons $P_{16,b}$ from the polygon $P_{16}$. Thus, the operation $P_{16,f} = P_{16} \backslash P_{16,b}$ is carried out.

Figure 6:
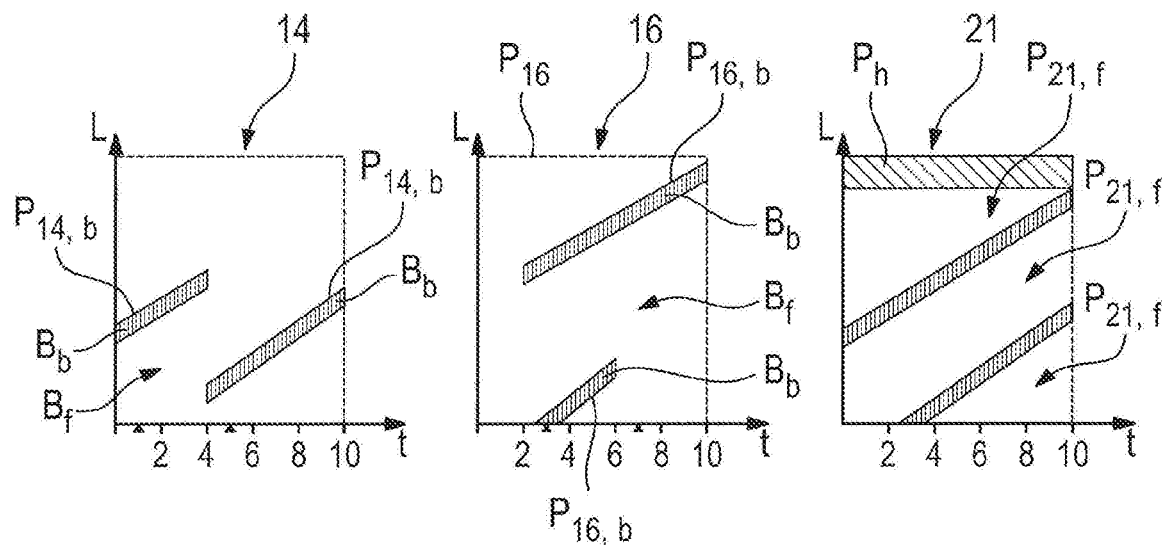

Next, as illustrated in FIG. 6, the free subareas of the lane change zone 21 are determined (step S3). Specifically, the lane change zone 21 is free when both the current lane 14 and the additional lane 16 are free, and when the lane change zone 21 is not untravelable for other reasons, for example due to obstacles or a no-passing zone.

Thus, the free subareas of the lane change zone 21, or more precisely, a polygon $P_{21,f}$, which corresponds to the free subareas of the lane change zone 21, are determined as the intersection of the two polygons $P_{14,f}$ and $P_{16,f}$. If the lane change zone 21 cannot be traveled on due to an obstacle or some other reason, a corresponding space-time polygon $P_h$ that encompasses the subarea of the lane change zone 21 that cannot be traveled on is determined and removed from the above-mentioned intersection.

In other words, the free subareas $P_{21,f}$ of the lane change zone 21 result from the operation $$P_{21,f} = (P_{14,f} \cap P_{16,f}) \backslash P_h.$$

Figure 7:
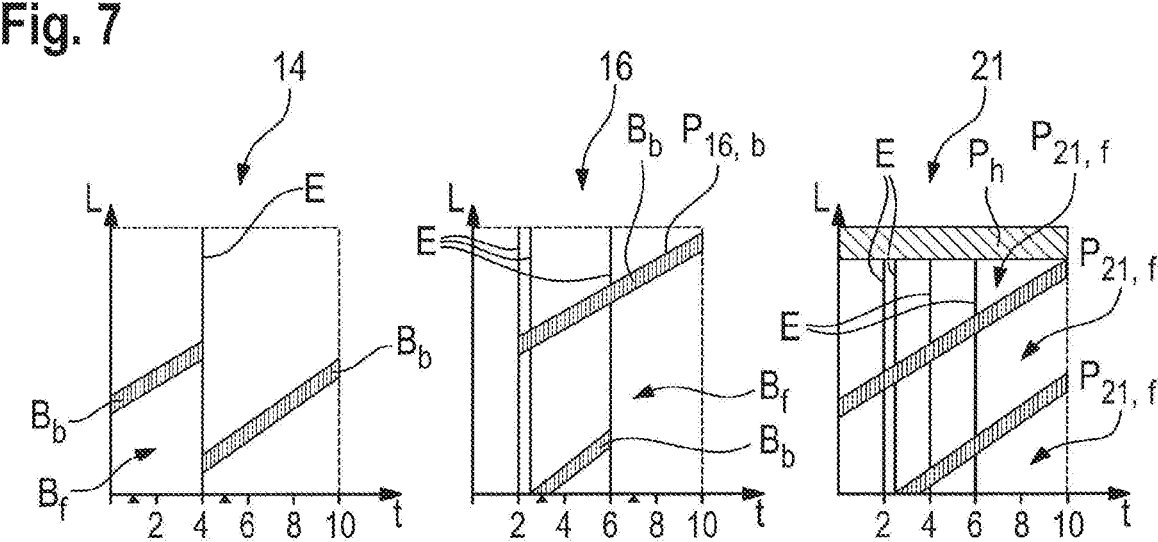

The diagrams for the current lane 14 and for the additional lane 16 are now each divided into time strips (step S4), wherein a new time strip begins with each event. In FIG. 7 the various time strips are separated from one another by vertical separating lines E which are inserted into the diagram for each event. Here and in the following discussion, an event is understood to mean any type of change in the occupancy of the particular lane 14, 16.

Thus, if at a certain point in time an occupancy of a given subarea of the current lane 14 or of the additional lane 16 begins or ends, at this point in time a new time strip begins in the diagram for the current lane 14 or for the additional lane 16.

The separating lines E between the individual time strips in the diagrams for both lanes 14, 16 are also transferred to the diagram for the lane change zone 21.

Figure 9:
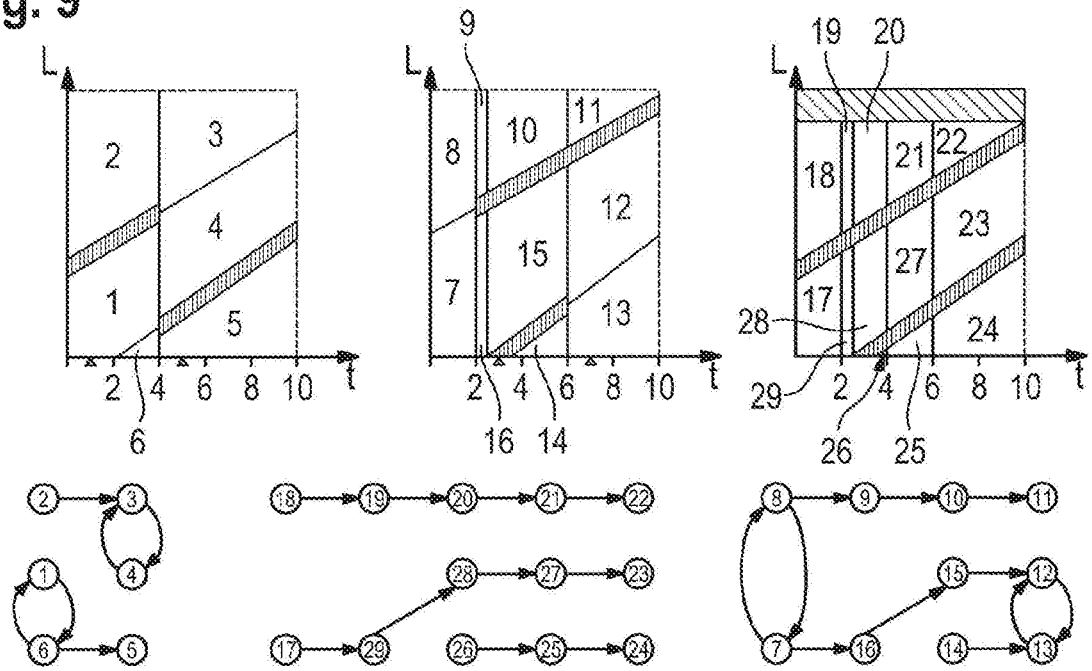
Figure 10:
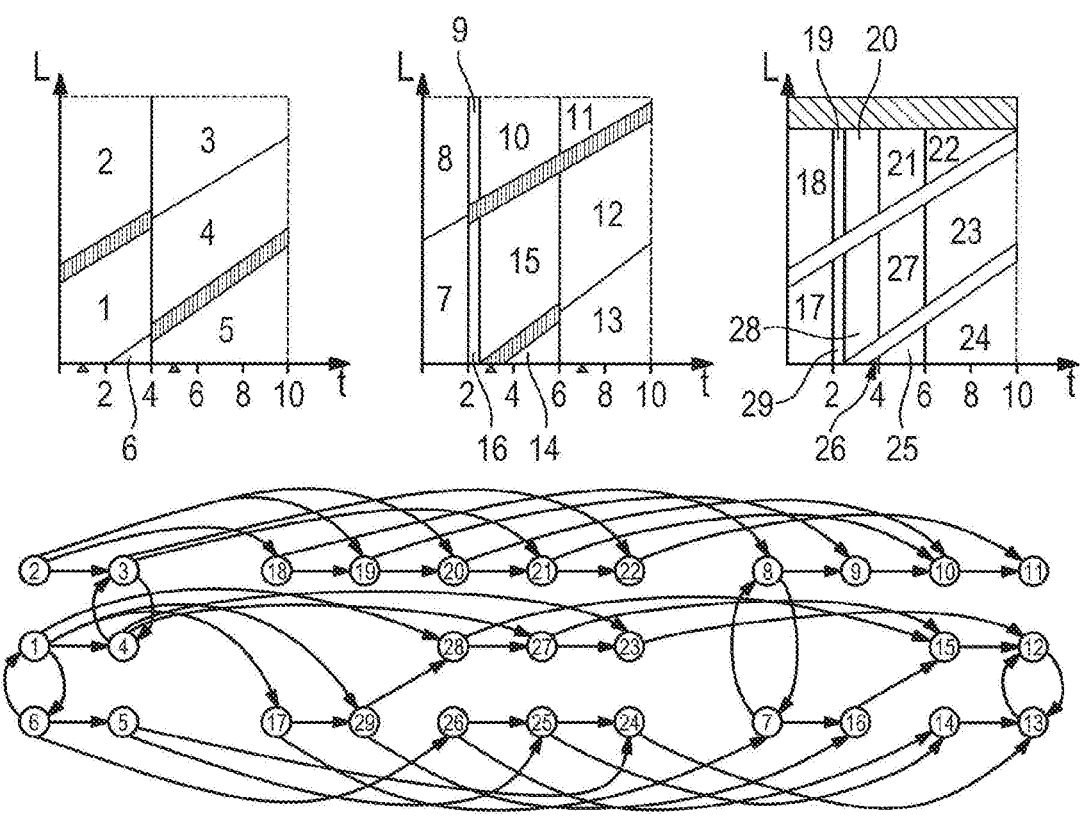

To achieve a consistent subdivision of the diagrams between the three diagrams for the current lane 14, the additional lane 16, and the lane change zone 21, oblique separating lines T which in each case represent an extension of one of the occupied areas $B_b$ are inserted into the diagrams for the current lane 14 and the additional lane 16. These additional oblique separating lines T are shown in FIGS. 8 through 10.

The vertical separating lines E, the oblique separating lines T, and the occupied areas $B_b$ divide each of the three diagrams into multiple subareas $T_i$, where i is a natural number greater than zero and may assume values of 1 to a total number of subareas $T_i$.

Figure 8:
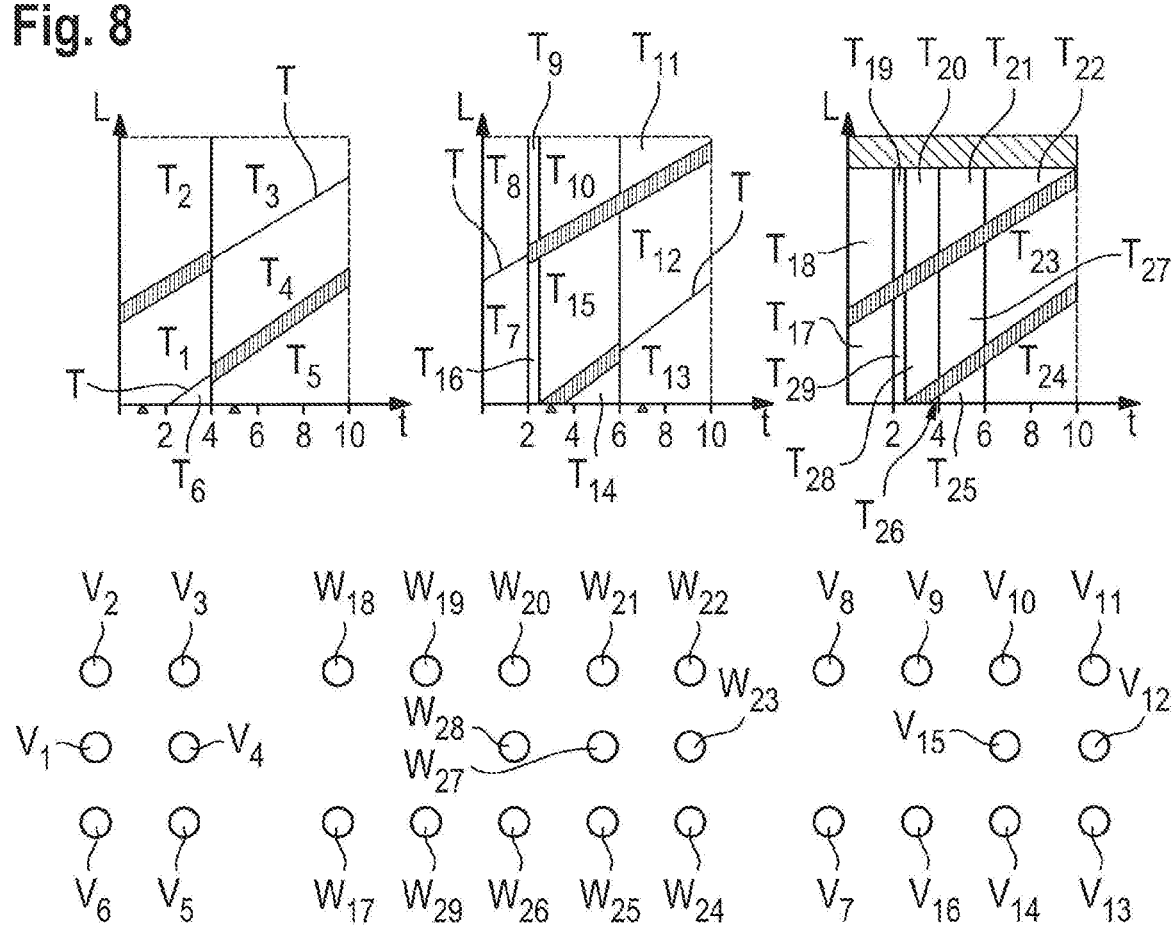

As shown in FIG. 8, a lane vertex $V_i$ is next associated with each of the subareas $T_i$ of the diagrams for the current lane 14 and for the additional lane 16, while a change zone vertex $W_i$ is associated with each subarea $T_i$ of the diagram for the lane change zone 21 (step S5). Once again, i is a natural number greater than zero and may assume values of 1 to a total number of subareas $T_i$.

In FIG. 8 the lane vertices $V_i$ and the change zone vertices $W_i$ are time-ordered within the diagram; i.e., the vertices that correspond to subareas $T_i$ having shorter times are farther to the left than the vertices associated with subareas $T_i$ having longer times.

Next, the lane vertices $V_i$ of the current lane 14 are joined in pairs at the edges (step S6), more precisely, at directed edges, when a driving maneuver of the motor vehicle 10 between the subareas $T_i$ associated with the lane vertices $V_i$ is possible.

Specifically, a driving maneuver is defined as "possible" when the two subareas $T_i$ directly adjoin one another, i.e., are not separated by an occupied area $B_b$. In addition, a driving maneuver is naturally possible only in the positive time direction.

The same procedure is repeated for the lane vertices $V_i$ of the additional lane 16 and for the change zone vertices $W_i$ of the lane change zone 21.

It is pointed out that the letters "T," "V," and "W" are omitted in FIGS. 9 and 10 for reasons of clarity. Instead, the subareas and the vertices are simply provided with the appropriate number. Thus, numerals in FIGS. 9 and 10 are not reference symbols, and instead represent the index of the corresponding subarea or of the corresponding vertex.

The result from step S6 is shown in FIG. 9. The graph obtained in step S6 contains all possible driving maneuvers for the motor vehicle 10 within the two lanes 14, 16 and within the lane change zone 21.

Next, the vertices $V_i$ of the current lane 14 and the change zone vertices $W_i$ whose associated subareas $T_i$ of the current lane 14 and of the lane change zone 21 overlap with one another are joined via directed edges (step S7). In other words, the lane vertices $V_i$ and the change zone vertices $W_i$ whose associated subareas $T_i$ have an intersection set that is not empty are joined when the two diagrams for the current lane 14 and for the lane change zone 21 are superimposed.

In addition, the change zone vertices $W_i$ and the lane vertices $V_i$ of the additional lane 16 whose associated subareas $T_i$ of the lane change zone 21 and of the additional lane 16 overlap with one another are joined via directed edges. Thus, the lane vertices $V_i$ and the change zone vertices $W_i$ whose associated subareas $T_i$ have an intersection set that is not empty are joined when the two diagrams for the additional lane 16 and for the lane change zone 21 are superimposed.

In other words, in step S7 the individual subareas $T_i$ of the free areas $B_f$ are divided into change areas in which a lane change between the two lanes 14, 16 is possible, and lane change areas in which a lane change between the two lanes 14, 16 is not possible.

The result from step S7 is shown in FIG. 10. The graph obtained in step S7 contains all possible driving maneuvers for the motor vehicle 10 involving a change from the current lane 14 to the additional lane 16. Each of the possible driving maneuvers corresponds to an uninterrupted sequence of edges in the graph shown in FIG. 10.

The various possible driving maneuvers thus determined are then further processed by an optimization module 36 of the control unit 30 or by some other optimization module of the computer program.

The optimization module 36 initially classifies the possible driving maneuvers into various driving maneuver classes (step S8).

The driving maneuver classes basically differ from one another in that driving maneuvers from different driving maneuver classes are not homotopic relative to one another. In other words, the space-time trajectories, which correspond to the driving maneuvers and describe the movement of the motor vehicle 10 in a space-time diagram, cannot be continuously converted from one into another by deformation without crossing one of the occupied areas $B_b$.

Expressed in an illustrative manner, this means that the motor vehicle 10 travels past various obstacles, for example the further road users 18, 20 or other obstacles, in a different time sequence, or that further road users travel past the motor vehicle 10, in the travel direction of the motor vehicle 10 or in the opposite direction, in a different time sequence.

In addition, the motor vehicle 10 in principle may also pass other road users on the right, at least in a traffic situation that is different from the one shown in FIG. 1. Other road users may likewise travel past the motor vehicle 10 on the left or the right.

The individual variants in each case differ in that the corresponding space-time trajectories are not homotopic relative to one another. The distinguishing features of the individual variants may also be referred to as characteristic variables for the driving maneuvers, which describe essential features of the particular driving maneuver.

The driving maneuver classes are disjunct; i.e., each driving maneuver can be associated with only one driving maneuver class. Accordingly, driving maneuvers from two various different maneuver classes differ by at least one or multiple characteristic variables.

For the classification, it is sufficient to generate an individual space-time trajectory for each of the possible driving maneuvers, for example by selecting a single point from the individual space-time regions, which is associated with a lane vertex $V_i$ or a change zone vertex $W_i$, and then joining the points together. However, the resulting trajectory should be smooth, i.e., should not have any bends or the like. For example, the individual points are joined together via spline functions in order to obtain the space-time trajectories.

In summary, in step S8 the various possible driving maneuvers are thus classified into the driving maneuver classes by means of a homotopy analysis of the corresponding space-time trajectories.

An individual, representative driving maneuver is now selected from each of the driving maneuver classes, and each of the representative driving maneuvers is optimized (step S9), as explained in greater detail below.

The representative driving maneuver for each driving maneuver class is selected from the possible driving maneuvers of the corresponding driving maneuver class, based on predefined criteria or randomly.

For optimizing the representative driving maneuvers, a cost functional F is determined which assigns a cost factor K=F(x) to the space-time trajectory $$x = \begin{pmatrix} L(t) \\ N(t) \end{pmatrix},$$

which describes the particular representative driving maneuver.

More precisely, the cost functional F is quadratic in the space-time trajectory x, and is defined as follows:

$$F(x) = \tfrac{1}{2} x^T P x + q^T x.$$

The matrix P and the row vector $q^T$ contain all cost parameters that are necessary to assign the corresponding cost factor to the particular representative driving maneuver. A driving maneuver is more unfavorable the higher the cost factor that is assigned to it.

More precisely, the cost functional includes cost parameters that take into account driving comfort during travel and/or a desired speed to be attained. Alternatively or additionally, the cost functional includes penalty terms that increase the cost factor for predefined driving maneuver components. For example, a penalty term may be provided for a lane change, so that driving maneuvers that require several such lane changes are suppressed.

To optimize the possible driving maneuver in question, the cost functional is extremized, or more precisely, minimized. Thus, the driving maneuver whose space-time trajectory results in a local minimum of the cost functional is determined. A local minimum cost factor, in particular a global minimum cost factor, is thus associated with the optimized driving maneuver.

The motor vehicle 10 is subject to various intrinsic limitations. For example, the motor vehicle 10 has a maximum acceleration and a maximum deceleration which in each case cannot be exceeded. In addition, the motor vehicle 10 is subject to various external limitations. For example, it cannot be situated at the same location as an obstacle, which would be tantamount to a collision. Furthermore, a speed limit applies on most roadways.

To take the intrinsic and external limitations into account, constraints are determined, based on the limitations, under which the cost functional is then minimized. A target driving maneuver is thus obtained which under the given constraints represents the optimum driving maneuver from the particular driving maneuver class.

At least one of the constraints is a time-variant constraint which is individually determined for the particular driving maneuver class (step S10).

The at least one time-variant constraint is ascertained based on the space-time polygons determined in steps S1 through S5, which describe the free space-time regions $B_f$ and the occupied space-time regions $B_b$ as well as the subareas $T_i$.

At no point in time may the motor vehicle 10 be situated in one of the occupied areas $B_b$. However, this alone is generally too weak as a constraint, since a certain safety distance is normally necessary.

Therefore, the at least one time-variant constraint is determined in such a way that it includes a predetermined temporal safety distance and/or a predetermined spatial safety distance from the occupied areas $B_b$.

A "temporal safety distance" is understood to mean a time period $T_{TTC}$ in which the vehicle, starting from the current point in time, can definitively move in a collision-free manner, even if the motor vehicle does not change its motion state, for example does not brake. This time period may also be referred to as "time to collision."

A spatial safety distance always corresponds to a temporal safety distance; however, the temporal safety distance is a function of the current speed of the motor vehicle. More precisely, the temporal safety distance results from the quotient of the spatial safety distance and the current speed v(t) of the motor vehicle.

The at least one time-variant constraint may generally be expressed as follows:

$$L(t) + v(t) \cdot T_{TTC} \notin B_b.$$

Thus, at any given point in time t the longitudinal coordinate L of the space-time trajectory x(t) must be a minimum distance from the occupied areas $B_b$, the minimum distance being a function of the current speed v(t).

The time-variant constraint is also a function of where the motor vehicle 10 is situated at the moment. For example, if it is situated in the subarea $T_5$ (see FIG. 8), the corresponding constraint is as follows:

$$L(t) + v(t) \cdot T_{TTC} \leq \max P_{14,b}(t + T_{TTC}).$$

It is pointed out that the above inequality is to be understood conceptually rather than literally. "max P" is understood to mean that the corresponding polygon delimits the subarea $T_5$ at the top.

Thus, figuratively speaking, the motor vehicle 10 also cannot be situated in the area delimited by the polygon $P_{14,b}$ when the motor vehicle is in steady, continuous motion for the time period $T_{TTC}$.

In contrast, if the motor vehicle is situated in the subarea $T_{15}$, the time-variant constraint is expressed as follows:

$$\min P_{16,b}(t + T_{TTC}) \leq L(t) + v(t) \cdot T_{TTC} \leq \max P_{14,b}(t + T_{TTC})$$

Analogously to the case described above, $\min P_{16,b}(t + T_{TTC})$ here describes the polygon that delimits the subarea $T_{15}$ at the bottom.

The time-variant constraint under which the driving maneuver is optimized is thus determined individually for each driving maneuver class and/or for the individual subareas $T_i$. Accordingly, the time-variant constraint may also change over the course of the space-time trajectory.

Even further constraints may be provided, for example a safety condition, a comfort condition, and/or a feasibility condition. One example of a feasibility condition is whether the motor vehicle can even reach a certain space-time region based on a maximum acceleration or a maximum deceleration of the motor vehicle. One example of a comfort condition is whether the acceleration in the longitudinal and/or transverse direction exceeds a predefined limit value which, based on experience, is perceived as uncomfortable by the vehicle occupants. One example of a safety condition is a minimum distance to be maintained from other road users, or a speed limit.

In summary, in step S9 various driving maneuvers that are conceptually different from one another, i.e., the driving maneuvers from different driving maneuver classes, are each optimized under the at least one time-variant constraint, and optionally under further constraints. Accordingly, the particular optimum driving maneuver, i.e., the target driving maneuver in each case, is obtained for each of the driving maneuver classes.

The result from step S9 is thus a set of optimum driving maneuvers from different driving maneuver classes.

It is pointed out that the optimization may take place in two steps, the longitudinal trajectory initially being optimized, and the transverse trajectory of the motor vehicle 10 then being optimized.

Lastly, one of the target driving maneuvers is selected and the motor vehicle 10 is controlled by the control unit 30 in an at least partially automated manner, in particular completely automatically, according to the selected driving maneuver (step S11).

The target driving maneuver may be selected based on predefined criteria. The predefined criteria may be stored in the motor vehicle 10 or in the control unit 30 by the manufacturer, and/or may be adapted by the driver of the motor vehicle. For example, the predefined criteria include one or more of the following variables: a maximum duration of the driving maneuver, a maximum speed and/or minimum speed of the motor vehicle 10, a maximum occurring longitudinal acceleration of the motor vehicle 10, and/or a maximum occurring transverse acceleration of the motor vehicle 10.

Alternatively or additionally, it may be provided that an appropriately trained machine learning module of one of the target driving maneuvers is selected, the motor vehicle 10 being controlled according to the selected target driving maneuver.

Alternatively or additionally, it is also conceivable for information concerning the various target driving maneuvers to be indicated to a driver of the motor vehicle 10. In particular, multiple possible target driving maneuvers are selected, and the driver may decide which of the target driving maneuvers is to be carried out.

The invention claimed is:

1. A method for controlling a motor vehicle (10) traveling on a roadway (12) in a current lane (14), wherein the roadway (12) has at least one additional lane (16) that is adjacent to the current lane (14) of the motor vehicle (10), having the following steps:
    transforming at least one of the current lane (14) and the at least one additional lane (16) into a Frenet-Serret coordinate system;
    generating possible driving maneuvers for the motor vehicle (10);
    determining a cost functional, wherein the cost functional associates a cost factor with each of the driving maneuvers;
    determining at least one time-variant constraint;
    minimizing the cost functional under the at least one time-variant constraint to obtain a target driving maneuver from the possible driving maneuvers; and
    controlling the motor vehicle (10) to follow the target driving maneuver.

2. The method according to claim 1, wherein the possible driving maneuvers are divided into classes and an optimized driving maneuver is determined for each class, wherein the target driving maneuver is selected from the optimized driving maneuvers based on predefined criteria.

3. The method according to claim 2, wherein at least one time-variant constraint is determined based on the driving maneuver class.

4. The method according to claim 1, wherein at least one time-variant constraint includes a safety condition, a comfort condition, and/or a feasibility condition.

5. The method according to claim 4, wherein at least one safety condition includes a predetermined spatial safety distance and/or a predetermined temporal safety distance.

6. The method according to claim 1, wherein the following steps are carried out for determining the at least one time-variant constraint:
    ascertaining free areas ($B_f$) and/or occupied areas ($B_b$) that are occupied by other road users (18, 20), at least in the current lane (14) of the motor vehicle (10) and in the at least one additional lane (16), wherein the free areas ($B_f$) and the occupied areas ($B_b$) are space-time regions; and
    determining the at least one time-variant constraint, based on the determined free areas ($B_f$) and/or the determined occupied areas ($B_b$).

7. The method according to claim 6, wherein the time-variant constraint includes a minimum distance from an edge of a free area ($B_f$) and/or a minimum distance from an occupied area ($B_b$) at a predefined point in time taking into account the minimum distance for the at least one possible driving maneuver at multiple predefined points in time.

8. The method according to claim 6, wherein the minimum distance is determined based on a speed of the motor vehicle (10) at the predefined point in time taking into account a predetermined spatial safety distance and/or based on a predetermined temporal safety distance.

9. The method according to claim 6, wherein in determining each minimum distance at least one space-time polygon corresponding to the current lane, at least one space-time polygon corresponding to the at least one additional lane, and at least one space-time polygon corresponding to the occupied areas are determined,
    wherein based on the determined space-time polygons, space-time polygons corresponding to the free areas of the two lanes are determined by polygon clipping, wherein those polygons corresponding to the occupied areas are removed in each case from the polygons that correspond to one of the two lanes (14, 16) in order to determine the free areas ($B_f$).

10. A control unit (30) for a system (26) of a motor vehicle traveling on a roadway (12) in a current lane (14), wherein the roadway (12) has at least one additional lane (16) that is adjacent to the current lane (14) of the motor vehicle (10), the control unit being designed to
    transform at least one of the current lane (14) and the at least one additional lane (16) into a Frenet-Serret coordinate system;
    generate possible driving maneuvers for the motor vehicle (10);
    determine a cost functional, wherein the cost functional associates a cost factor with each of the driving maneuvers;
    determine at least one time-variant constraint;
    minimize the cost functional under the at least one time-variant constraint to obtain a target driving maneuver from the possible driving maneuvers; and
    control the motor vehicle (10) to follow the target driving maneuver out a method according to claim 1.

* * * * *